May 27, 1969
F. C. WELLINGTON
3,446,386
PORTABLE CUSTODIAL UNIT
Filed March 6, 1967
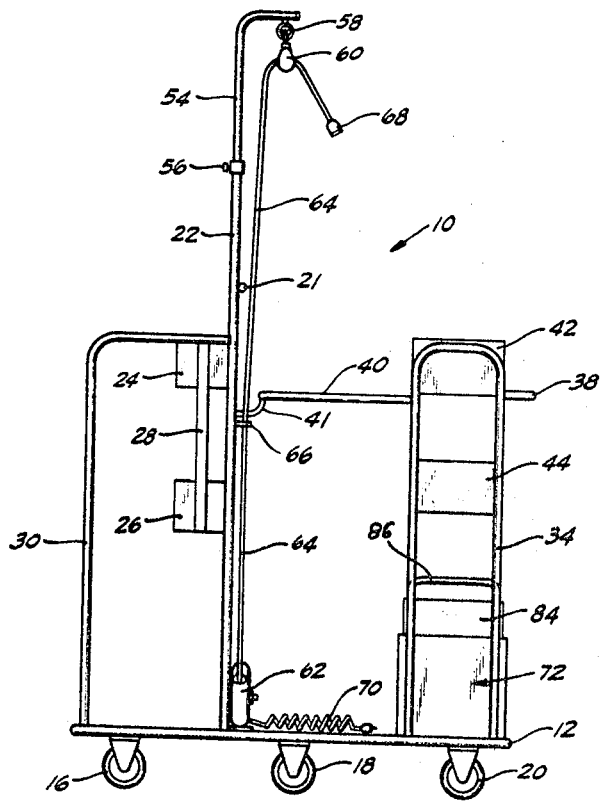
FIG 1
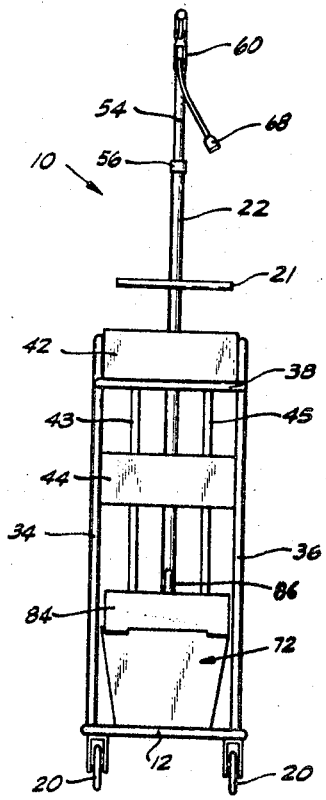
FIG 2
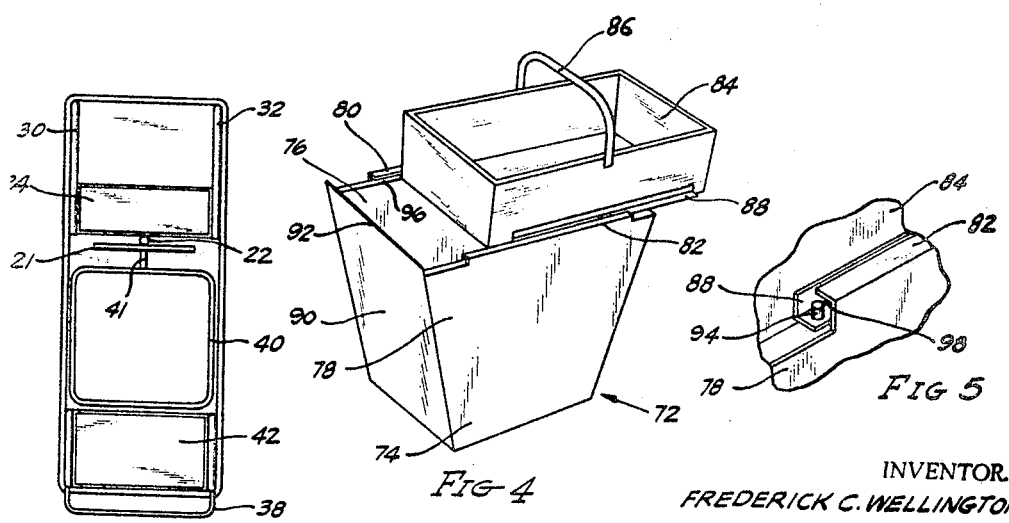
FIG 3
FIG 4
FIG 5
INVENTOR.
FREDERICK C. WELLINGTON
BY
*Jack M. Miller*
ATTORNEY

United States Patent Office 3,446,386
Patented May 27, 1969

3,446,386
PORTABLE CUSTODIAL UNIT
Frederick C. Wellington, 5201 Kenwood,
Buena Park, Calif. 90620
Filed Mar. 6, 1967, Ser. No. 621,063
Int. Cl. B65d 7/00
U.S. Cl. 220—4                    5 Claims

ABSTRACT OF THE DISCLOSURE

A portable custodial service unit is detachably carried upon a custodial cart and provides both a trash receptacle and a cleaning aids tray carried together.

Background

This invention is directed to a custodial cart which provides receptacles, containers, and other services to aid in the custodial care of classrooms and similar spaces. The custodial cart provides receptacles which are retained on the cart and holders for various custodial items. The invention is particularly directed to a removable custodial service unit which includes a trash receptacle as well as a tray for carrying custodial service aids and other equipment. The custodial service unit is provided because the conventional custodial cart is to large to pass through the aisles in the modern classroom, and is really too big a structure to be moved around the room for the performance of the small services.

Prior structures for aiding custodial service are well known in the art. These prior devices are janitors' wagons which carry trash receptacles, brooms, buckets, vacuum cleaners and other implements. Such wagons also have racks for the smaller items required in custodial service. In view of the narrower aisles in today's classrooms, these prior janitors' wagons are not able to pass through the aisles and thus do not serve the required purpose. They simply serve as a janitor's center, and the janitor spends much time walking to and from his wagon, rather than carrying the necessities for custodial service with him.

Summary

This invention is directed to a portable custodial unit useful on a custodial cart, and particularly a custodial cart which is arranged for optimum convenience for custodial room service in school rooms and the like. Such a custodial cart has permanent fixtures and receptacles for the holding of various custodial equipment, such as brooms, large trash bags, cleaning equipment and supplies, and the like. However, since modern school classrooms have narrower aisles, it is necessary to have a hand portable custodial unit which can be carried around the classroom. Thus, the portable custodial unit of this invention is detachably carried upon the cart. The portable custodial unit includes a trash receptacle and includes a tray for the carrying of custodial supplies and equipment which are used around the room. The tray is mounted upon the trash receptacle, and is conveniently demountable therefrom so that both can be carried as a single unit, but used separately with a minimum of difficulty.

The advantages of this invention are to provide a custodial cart which stands sufficiently close to supply the various needs within the room, and to provide a hand portable unit which is carried along to aid in the custodial care of individual units around the room. This solves the problems of the prior art where janitorial wagons could not pass the school room aisles and the fact that prior structures have not been able to supply these various needs for most efficient, convenient, and adequate custodial care.

Accordingly, it is an object of this invention to provide a custodial cart which is arranged to carry all of the custodial needs, and to provide a cart structure which retains the custodial equipment and supplies upon the cart. It is still another object of this invention to provide a custodial cart which includes a selectively detachably custodial unit which can be carried around the room, which unit includes a trash receptacle and a tray for the carrying of custodial equipment and supplies so that the portable unit can be carried around the room and aid in the performance of custodial services away from the custodial cart. Other objects and advantages of this invention will become apparent from a study of the following portion of this specification, the claims and the attached drawings.

Description of the drawings

FIG. 1 is a side elevational view of the custodial cart of this invention.

FIG. 2 is an end elevational view thereof.

FIG. 3 is a top plan view thereof.

FIG. 4 is an isometric view of the separable custodial unit removed from the custodial cart.

FIG. 5 is an enlarged detail of the structure of FIG. 4, with parts broken away, showing the separable units locked together.

Description

The custodial cart is generally indicated at 10. Custodial cart 10 is primarily built up of bent tubing. Base 12 comprises a substantially rectangular structure built up of bent tubing, with a floor extending from one side to the other. Support wheels 16, 18, and 20 are arranged in pairs beneath base 12 to support the structure and permit the cart 10 to be propelled to the place where it is needed. Preferably, the two pairs 16 and 20 of the wheels are casters. Uprights extend upward from the floor. These uprights perform various supporting functions.

Upright 22 is an antenna mast which extends upward from floor 14 midway between the side edges. Secured to mast 22 are receptacles 24 and 26. Both receptacles 24 and 26 have open tops and closed sides and bottoms. They are joined to each other by means of side straps 28, one of said side straps being positioned on each end of the receptacles. Side bars 30 and 32 extend upward from base 12 at the sides thereof and extend backward to be secured to receptacle 24 at the top ends thereof. Side bars 30 and 32 leave an opening at the front of cart 10, but form side supports at the sides of these spaces defined by the side bars. Thus, mast 22 is additionally supported by means of the side bars. Cross bar 21 secured to mast 22 is used to hold a roll of paper towels or other items which may be slipped over or hung on cross bar 21.

The rear end of custodial cart 10, as seen at the right of FIG. 1 and as seen in elevation in FIG. 2, has an upstanding, inverted U-shaped support bar on each side thereof. Support bar 34 and support bar 36 extend upward from the sides of base 12 adjacent the front end of the base. At the top, support bars 34 and 36 are secured to each other by handle 38. In the center space of custodial cart 10, between support bars 34 and 36 and mast 22, ring 40 is secured to the mast by bracket 41 and is secured to support straps 43 and 45 which rest on floor 14 and are attached to receptacle 44. Thus, support bars 34 and 36 are restrained in position. Receptacles 42 and 44 are preferably fixed between support bars 34 and 36. Receptacles 42 and 44 each have closed bottoms and sides, and open tops. Thus, together with receptacles 24 and 26 they are adapted to carry custodial equipment and supplies.

The front end of custodial cart 10 between side bars 30 and 32 has adequate space for the placement of a vacuum cleaner thereof. Furthermore, receptacles 24 and 26 can carry vacuum cleaner attachments or other supplies, and additional brackets can carry a dust mop or push broom for the cleaning of floors which are not carpeted. Furthermore, ring 40 carries a large bag (not shown) hanging down therein for the reception of trash. Receptacles 42 and 44 can carry window, chalkboard or desk cleaning supplies, or the like. Thus, all of the needed maintenance equipment can be brought to the doorway or into the doorway of a room.

In order to conveniently supply electric power to the vacuum cleaner as the vacuum cleaner is used through the room, mast 22 extends upwardly and has telescoped in the top thereof upper mast or antenna 54. Adjustable lock 56 permits the upper mast 54 to be raised telescopically to the maximum height, and still when lowered pass through a doorway. The upper end of upper mast 54 carries ring 58 to which is detachably secured pulley 60. Mounted upon floor 14 is electric cord windup reel 62. Reel 62 has an electric cord 64 extending therefrom. Cord 64 passes through guide 66 and pulley 60 to terminate in plug 68. The windup tension of reel 62 is sufficient to rewind cord 64 and to maintain a tension upon cord 64. Cord 64 can also pass through mast 22 and upper mast 54 if the masts are hollow, thus eliminating cord guides. Thus, when a vacuum cleaner is plugged into plug 68, and the vacuum cleaner is moved about the room, the vacuum cleaner cord and cord 64 are suspended by the cord tension so that they do not tangle on furniture. Coiled cord 70 is electrically connected to cord 64, and is plugged into an adjacent receptable to supply power to plug 68 and thus to the vacuum cleaner or other electrical appliance. Thus, custodial card 10 can be brought into a room, just inside the doorway and supply the vacuum power means to the entire room and serve as a custodial maintenance center. Detachably secured pulley 60 can be detached from ring 58 and attached to a similar ring or hook at the top of the doorway or other elevated location in the room to be cleaned. Then pulley 60 serves in the same manner with cord 64 as when detachably secured pulley 60 is attached to ring 58.

The custodial cart is thus convenient, but does not supply one of the most important, basic equipment needs. That is the need for a truly hand portable unit that can be moved around the room during custodial maintenance.

In order to aid custodial care of the room, and provide convenient transportation of small custodial equipment and supplies, custodial unit 72 is thus provided. Custodial unit 72 is carried between support bars 34 and 36, on the floor below receptacle 44, as is shown in FIGS. 1 and 2. FIG. 4 shows a separate and more detailed view of custodial unit 72. Custodial unit 72 includes basket 74 which has closed sides and bottom, and an open top. Sides 76 and 78 are provided at the top edge thereof with inwardly facing angles 80 and 82 which define guide slots 96 and 98 at the top edges of the sides. Receptacle 84 has a carrying handle 86 and outwardly extending tracks 88. Track 88 on the near side is shown in FIGS. 4 and 5, while a similar track is present on the far side of receptacle 84 and engages under angle 80. These tracks engage upon the top edge of sides 76 and 78 and underneath the angles in slots 96 and 98 so that receptacle 84 may be slid off the top of basket 74, as shown. However, when receptacle 84 is slid into place, it engages against the upward extending portion of end 90 which forms stop 92. Thus, basket 74 can be picked up by raising receptacle 84 by handle 86. Furthermore, stop 94 extends upwardly out of the inner end of the tracks 88 so that it engages beyond the ends of angles 80 and 82 when basket 74 is fully in place and is lifted by handle 86. Thus, while carrying, the two pieces are secured together in a single unit. With the indicated construction of custodial unit 72, custodial unit 72 can be picked up from its space between support bars 34 and 36 and carried around the room. As long as custodial unit 72 is being carried, basket 74 and receptacle 84 firmly lock together by means of stop 92 formed on the end of basket 74 and stop 94 formed on the track.

In use, custodial cart 10 is moved to the doorway of the room. The door is unlocked, opened, the door surfaces cleaned, and the lights are turned on in the room. If the doorsill so permits, custodial cart 10 is moved inside the room, just inside the doorway so that it is in the most convenient location. Custodial cart is plugged into a nearby receptacle by means of coiled cord 70.

Next, custodial unit 72 is removed from the cart and the custodian carries this around the room as he performs services around the periphery of the room. These services include cleaning the blackboard, emptying the pencil sharpener, and emptying the wastebasket in the room. Basket 74 is opened by sliding back receptacle 84 for dumping debris from the room wastebasket and pencil sharpener to the basket. Receptacle 84 carries the materials for cleaning the chalkboard, replacing the erasers, cleaning the windows, and other services required around the periphery of the room. Next, custodial unit 72 is returned to custodial cart 10. Basket 72 is emptied into the large waste bag hung on ring 40 and the dirty blackboard erasers picked up around the room are removed from receptacle 84 and placed in one of the other receptacles on custodial cart 10. Clean erasers are replaced into receptacle 84. Thus, custodial unit 72 is ready for the next room.

Floor service and the services around the center of the room are next to be performed. If the room is carpeted, a vacuum cleaner is removed from custodial cart 10 where it was resting between side bars 30 and 32. Since the front of the cart is open, the vacuum cleaner may be readily removed. Preferably, the vacuum cleaner is already plugged into plug 68 so that it is ready for immediate use. As the vacuum cleaner is moved around the room, the tension of cord 64 and the height of pulley 60 keeps cord 64 from tangling up on desks and chairs within the room, Thus, vacuuming can proceed through the entire room. When the services in the center of the room are completed, the vacuum cleaner is returned to its place upon custodial cart 10 and cord 64 is automatically rewound as the cleaner is returned to its place. The order in which the steps of use of the custodial cart are performed is not critical, and the room cleaning can thus be done in any sequence.

This invention having been described in its preferred embodiment, it is clear that it is susceptible to numerous modifications and embodiments within the ability of the routine artisan and without the exercise of the inventive faculty.

I claim:
1. A portable custodial unit consisting of:
   a basket adapted to receive trash, said basket having closed ends, sides and bottom, and an open top;
   a receptacle, adapted to hold custodial items, detachably mounted upon the top of said basket, said receptacle having an open top and closed ends and sides upwardly extending from a closed receptacle bottom, said basket being significantly larger than said receptacle, said receptacle and said basket being of noninterchangeable construction, said receptacle closing the open top of said basket when said receptacle is in position on the top of said basket;
   securing means for detachably securing said receptacle on the top of said basket; and
   handle means directly attached to said receptacle, said handle means permitting said receptacle and said basket to be raised together when said receptacle is attached to said basket.
2. The portable custodial unit of claim 1 wherein said detachable securing means comprises a single pair of guideway means secured to said basket and guide means secured to said receptacle, said guideway means and said guide means being horizontally oriented when said handle is extending upwardly, and wherein said guideway means comprises the top edges of said basket sides and inwardly extending flanges extending over said top edges so as to define a slot therebetween, and said guide means comprising a flange extending outwardly upon each side of said receptacle, said flanges being engageable in said slots so that the receptacle can be moved off the top of said basket in the direction parallel to said slots.

3. The portable custodial unit of claim 2 wherein one of said ends of said basket extends above said guide means to form a stop so that when said receptacle is centered on said basket, said receptacle substantially engages said stop formed by said end on said basket, and wherein the area of said basket bottom is smaller than the area of said basket top.

4. A custodial cart, said custodial cart having a base and supporting wheels under said base, said custodial cart having support means thereon for supporting and retaining custodial equipment and supplies including a large trash container, and a portable custodial unit carried on said custodial cart, said portable custodial unit consisting of a basket having closed ends, sides and bottom, and an open top, said basket being adapted to receive trash, a receptacle, adapted to hold custodial items, detachably mounted to the top of said basket, said receptacle having an open top and closed ends and sides upwardly extending from a closed receptacle bottom, said basket being significantly larger than said receptacle, said receptacle and said basket being of noninterchangeable construction, said receptacle closing the top of said basket when said receptacle is in position on top of said basket, securing means for detachably securing said receptacle on the top of said basket, handle means directly attached to said receptacle, said handle means permitting said receptacle and said basket to be raised together when said receptacle is attached to said basket, so that said portable custodial unit can be removed from said cart and can be used for custodial servicing independent of said cart, trash from said receptacle being depositable in said large trash container.

5. A portable custodial unit comprising:

a basket having closed ends, sides and bottom, and an open top, a receptacle detachably mounted on the top of said basket, said receptacle closing the open top of said basket when said receptacle is in position on the top of said basket, handle means on said receptacle, said handle means permitting said receptacle and said basket to be raised together when said receptacle is attached to said basket, and securing means for detachably securing said receptacle on the top of said basket, said securing means comprising guide means and guideway means horizontally oriented when said handle is extending upwardly, said guideway means comprising the top edges of said basket sides and inwardly extending flanges extending over said top edges so as to define a slot therebetween, said guide means comprising a flange extending outwardly upon each side of said receptacle, said flanges being engageable in said slots so that said receptacle can be moved off the top of said basket in the direction parallel to said slots, and wherein said inwardly extending flanges terminate short of the ends of said sides, an upwardly extending stop pin of overall height less than the height of said slot being formed on at least one of said outwardly extending flanges on said receptacle so that when said receptacle is centered on said basket, said stop pin on said receptacle flange extends past the end of said basket flange to retain said receptacle on said basket.

References Cited

UNITED STATES PATENTS 1,746,134 2/1930 Thompson _____ 280—79.2
2,807,387 9/1957 Siciliano _____ 220—4

LEO FRIAGLIA, *Primary Examiner.*

ROBERT R. SONG, *Assistant Examiner.*

U.S. Cl. X.R.

220—23, 41; 280—79.2